(12) United States Patent
Grigorovitch et al.

(10) Patent No.: US 8,245,310 B2
(45) Date of Patent: Aug. 14, 2012

(54) CONTROLLING ACCESS TO MULTIPLE PIECES OF CONTENT OF A PRESENTATION

(75) Inventors: Alexandre V. Grigorovitch, Redmond, WA (US); James M. Alkove, Woodinville, WA (US); Muthukrishnan Paramasivan, Naperville, IL (US)

(73) Assignee: Microsoft Corporation, Redmond, WA (US)

( * ) Notice: Subject to any disclaimer, the term of this patent is extended or adjusted under 35 U.S.C. 154(b) by 838 days.

(21) Appl. No.: 11/821,755

(22) Filed: Jun. 25, 2007

(65) Prior Publication Data
US 2008/0320551 A1     Dec. 25, 2008

(51) Int. Cl.
*G06F 21/00* (2006.01)
(52) U.S. Cl. .......................................................... 726/28
(58) Field of Classification Search .................. None
See application file for complete search history.

(56) References Cited

U.S. PATENT DOCUMENTS

| | | | |
|---|---|---|---|
| 6,611,813 B1* | 8/2003 | Bratton | 705/26 |
| 7,110,982 B2 | 9/2006 | Feldman et al. | |
| 2003/0215224 A1 | 11/2003 | Yoo et al. | |
| 2004/0162846 A1 | 8/2004 | Nakahara | |
| 2004/0181667 A1* | 9/2004 | Venters et al. | 713/164 |
| 2004/0186853 A1 | 9/2004 | Yamamoto et al. | |
| 2005/0049886 A1 | 3/2005 | Grannan et al. | |
| 2005/0201726 A1 | 9/2005 | Malcolm et al. | |
| 2006/0029093 A1 | 2/2006 | Van Rossum | |
| 2006/0062363 A1 | 3/2006 | Albrett | |
| 2006/0212405 A1* | 9/2006 | Gordon et al. | 705/59 |
| 2006/0294145 A1 | 12/2006 | Saunders et al. | |
| 2007/0016549 A1 | 1/2007 | Whitcher | |
| 2007/0056042 A1 | 3/2007 | Qawami et al. | |

FOREIGN PATENT DOCUMENTS

WO   2006058387 A1   6/2006

OTHER PUBLICATIONS

"PCT Search Report and Written Opinion", Application No. PCT/US2008/067634, (Dec. 31, 2008),10 pages.
A. Einhorn Michael, "Digitization and Its Discontents: Digital Rights Management, Access Protection, and Free Markets", Date: 2004, pp. 1-49.
Helberger, et al., "Digital Rights Management and Consumer Acceptability", Date: Dec. 2004, pp. 1-139.
Manasse, Mark S. "Why Rights Management is Wrong (and What to Do Instead)". http://www.w3org/200/12/drm-ws/pp/compaq.html.

* cited by examiner

*Primary Examiner* — Gilberto Barron, Jr.
*Assistant Examiner* — Simon Kanaan
(74) *Attorney, Agent, or Firm* — Wolfe-SBMC

(57) ABSTRACT

In one or more embodiments, a license associated with a first piece of content can grant rights with respect to a second and/or additional pieces of content. That is, language that is included in a first license can express a policy that is interpreted by a client-side device. This policy can establish rights with respect to additional pieces of content. Accordingly, policy enforcement with respect to licensed content can take place on the client-side device and can establish how different content is to be played relative to one another.

19 Claims, 6 Drawing Sheets

CONTROLLING ACCESS TO MULTIPLE PIECES OF CONTENT OF A PRESENTATION

BACKGROUND

Today, many licenses for content such as multimedia content are expressed in simple language that specifies the rights of a user with respect to a single piece of content such as a movie or other presentation. These rights typically define permitted activities such as how many times a user can play a particular piece of content, whether or not the user can copy the content, and the like. This type of simplicity does not, however, provide the type of flexibility that would be desirable in many situations.

For example, in some scenarios it would be desirable to integrate or combine multiple different pieces of content so that the content can be presented together in some fashion. Yet, one of the limitations that provides challenges in this regard, as noted above, is that many licenses define rights for only one piece of content. Consider, for example, advertising scenarios. In many instances it is desirable to provide advertising material in connection with multimedia content. That is, a user may download a particular audio/video presentation that is accompanied by an advertisement that is to be played prior to the audio/video presentation. If the user happens to be online, a suitably configured server can control what the user watches and when, in terms of watching the advertising before the audio/video presentation. However, this scenario requires the user to be online and requires a server to control how content is presented to the user.

These types of scenarios limit the number of user scenarios for consuming content. One particular limitation in this instance is associated with users who are not online. Specifically, if users are not online, then a server cannot control how the content is presented to the user. Thus, a user will be unable to consume content that they may otherwise be able to consume if they were online.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, a license associated with a first piece of content can grant rights with respect to a second and/or additional pieces of content. That is, language that is included in a first license can express a policy that is interpreted by a client-side device. This policy can establish rights with respect to additional pieces of content. Accordingly, policy enforcement with respect to licensed content can take place on the client-side device and can establish how different content is to be played relative to one another.

In one or more embodiments, the client-side device includes a digital rights management (DRM) runtime environment that includes a policy manager and a state component. The policy manager receives licenses associated with different pieces of content, typically combined in a presentation. Individual licenses contain policy expressions that define how particular attributes or states are to be set in the state component. When a user takes an action with respect to a particular piece of content having an associated license, the policy manager can set a particular attribute or change a state in the state component. This changed attribute or state can then affect rights associated with a different piece of content that comprises part of the presentation.

BRIEF DESCRIPTION OF THE DRAWINGS

The same numbers are used throughout the drawings to reference like features.

DETAILED DESCRIPTION

Overview

Figure 1:
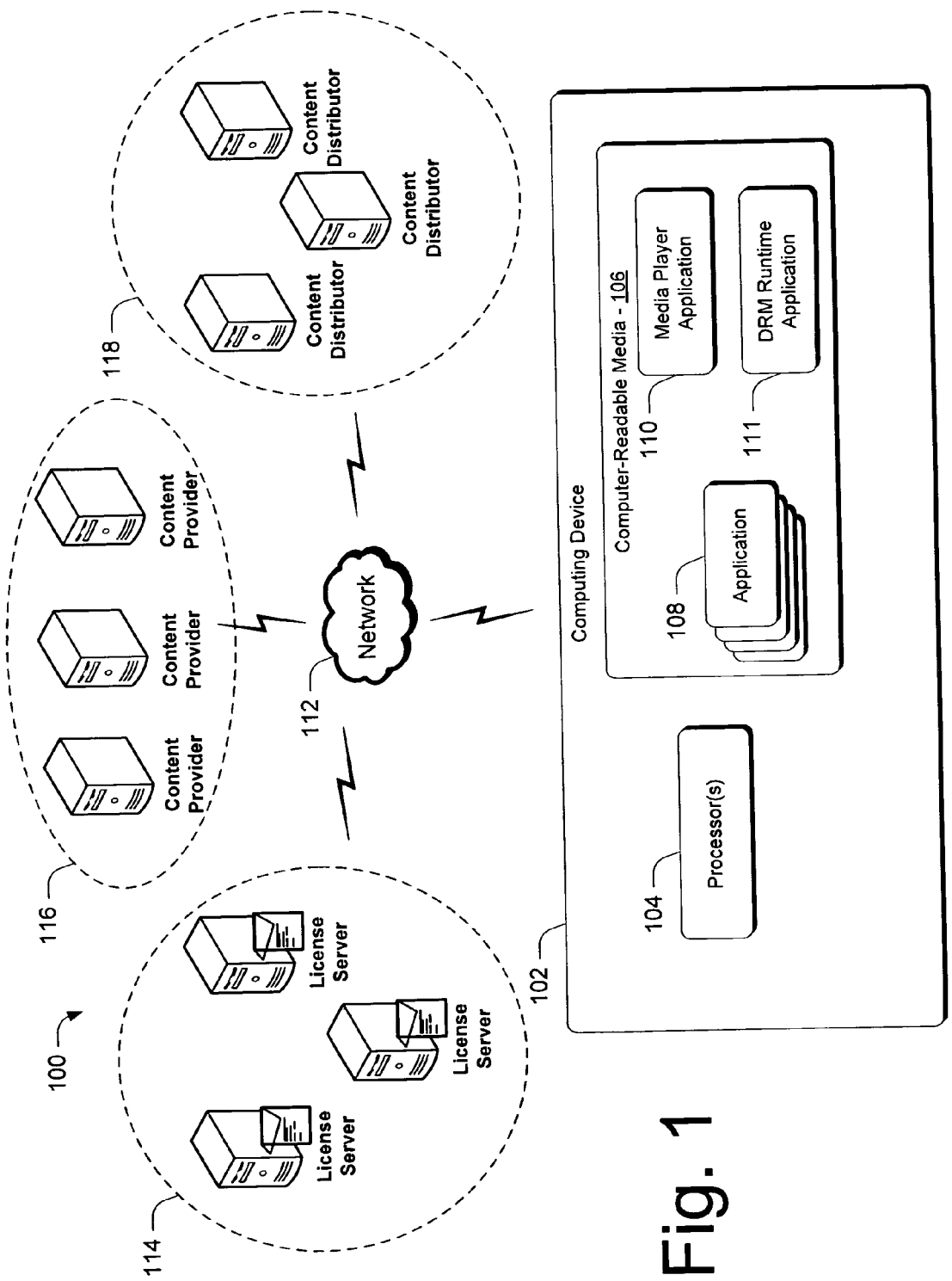
FIG. 1 illustrates an operating environment in accordance with one or more embodiments.

In one or more embodiments, a license associated with a first piece of content can grant rights with respect to a second and/or additional pieces of content, such as other licenses or content. That is, language that is included in a first license can express a policy that is interpreted by a client-side device. This policy can establish rights with respect to additional pieces of content. Accordingly, policy enforcement with respect to licensed content can take place on the client-side device and can establish how different content is to be played relative to one another. In various embodiments, client-side policy enforcement can enable various off-line scenarios, examples of which are provided below.

In one or more embodiments, the client-side device includes a digital rights management (DRM) runtime environment that includes a policy manager and a state component. The policy manager receives licenses associated with different pieces of content, typically combined in a presentation. A presentation can include, by way of example and not limitation, multiple different pieces of content that are associated with each other in some way. For example, a presentation might include a primary piece of content such as an audio/visual presentation and various advertisements that are to be played in conjunction with the primary piece of content. Individual licenses contain policy expressions that define how particular attributes or states are to be set in the state component. When a user takes an action with respect to a particular piece of content having an associated license, the policy manager can set a particular attribute or change a state in the state component. This changed attribute or state can then affect rights associated with a different piece of content that comprises part of the presentation.

The embodiments described above and below are particularly useful in the context of advertising material that is integrated with multimedia content, such as audio/visual content. Specifically, in at least some embodiments, a license is associated with advertising material and can define, through an expressed policy, how other multimedia content is to be consumed relative to the advertising material. For example, a content distributor may have a number of different advertisements that can be presented along with a particular movie. A license associated with one of the advertisements may specify that if the advertisement is viewed by the user, a particular attribute should be set in the DRM runtime environment executing on a client-side device. Now, a license associated with the movie may specify that the user can view the movie only if the particular attribute mentioned above is set in the DRM runtime environment. This simple scenario can ensure that before a user views the movie, they must have viewed the advertisement. By having a license for one piece of content define rights associated with one or more additional pieces of content, a very powerful and flexible tool is provided that can enable a variety of end-users scenarios, examples of which are provided below.

In the discussion that follows, a section entitled "Operating Environment" is provided and describes an example operating environment in accordance with one or more embodiments. After that, a section entitled "Implementation Example" is provided and describes one example implementation in accordance with one embodiment. Following this, a section entitled "Example Computing Device" is provided and describes but one example of a computing device that can be utilized to implement one or more embodiments.

Operating Environment

FIG. 1 illustrates an operating environment in accordance with one or more embodiments, generally at 100. Environment 100 includes one or more computing devices 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

In addition, computing device 102 includes a media player application 110 that can be utilized to play protected media content that is received by the computing device, as will become apparent below. The media player application provides a presentation runtime environment that includes software code that renders a presentation which is a combination of different pieces of media content. In addition, computing device 102 includes a DRM runtime application 111 that provides a DRM runtime environment that includes software code that processes licenses and enforces policies as described below. Together, the presentation runtime and DRM runtime environments work together to enforce policies that are expressed in various licenses that are associated with content that can be played by the media player application.

Any suitable media player application can be utilized, examples of which are available from the assignee of this document and others.

Computing device 102 can be embodied as any suitable computing device such as, by way of example and not limitation, a desktop computer, a portable computer, a handheld computer such as personal digital assistants (PDA), cell phone, and the like.

In addition, environment 100 includes a network 112, such as the Internet or some other suitable network that allows computing device 102 to communicate with a variety of entities that are involved in some way with one or more of distribution or protection of digital content. The example provided just below is intended to provide the reader with a basic overview of example entities and/or functionality that can exist within operating environment 100. The description is not intended to limit application of the claimed subject matter to one particular operating environment or type of operating environment.

Accordingly, in this particular example, such entities or functionality can include, by way of example and not limitation, various license servers 114, content providers 116 and content distributors 118.

In one or more embodiments, the license servers 114 are configured to serve digital rights management (DRM) licenses to various computing devices or end users. The DRM licenses typically describe and define the terms of use of a particular piece of content. In addition, the DRM licenses can contain keys that allow content that has been protected by encryption to be decrypted and subsequently played or consumed. In one or more embodiments, licenses that are served by the license servers include policy expressions that can affect rights associated with other pieces of content, as will become apparent below.

Content providers 116 are configured to serve content that is governed by one or more licenses that can be distributed by the license servers 114. In many instances, the content providers own and license the content that is being distributed. So, for example, in the multimedia context, the content providers can own the multimedia content that is to be distributed by content distributors 118.

Content distributors 118 can comprise any type of content distributor that distributes content to computing devices, such as computing device 102. Many times, these content distributors are unaffiliated with content providers 116, although such is not necessary. In practice, content providers 116 will license content distributors 118 to distribute protected content. As part of the process of distributing the content from content providers 116, content distributors 118 can modify or add to the content in some way to provide a presentation.

Specifically, many times, content distributors will build a business model surrounding distribution of this content. For example, some content distributors may sell advertising associated with content that is received from a content provider. The content distributors can then develop supplemental content in the form of advertising content and integrate the advertising content with the content received from the content providers to provide a presentation. In one or more embodiments, the supplemental content as well as the content received from the content provider resides in different files. In these embodiments, providing the supplemental content as well as the content provider's content as separate files results in economies that are gained because the supplemental content does not need to be physically integrated and encoded with the content provider's content. In addition, flexibility is enhanced insofar as providing the content distributor with an option to include various different types of supplemental content.

Each of the different pieces of content can include or be associated with its own individual license. The license for one piece of content, such as the license associated with the supplemental content, can include policy expressions that affect rights associated with the content from the content provider. So for example, a user who pays for a license to consume a particular movie may, in the process of consuming or attempting to consume that movie, be exposed to advertising that has been added by the content distributors. As noted above, a license associated with the advertising content added by the content distributor may include a policy expression that affects how and when a user can consume the content provider's content.

Having discussed an example operating environment, consider now an example implementation in which content can be distributed having licenses that affect the rights associated with other content.

Implementation Example

Figure 2:
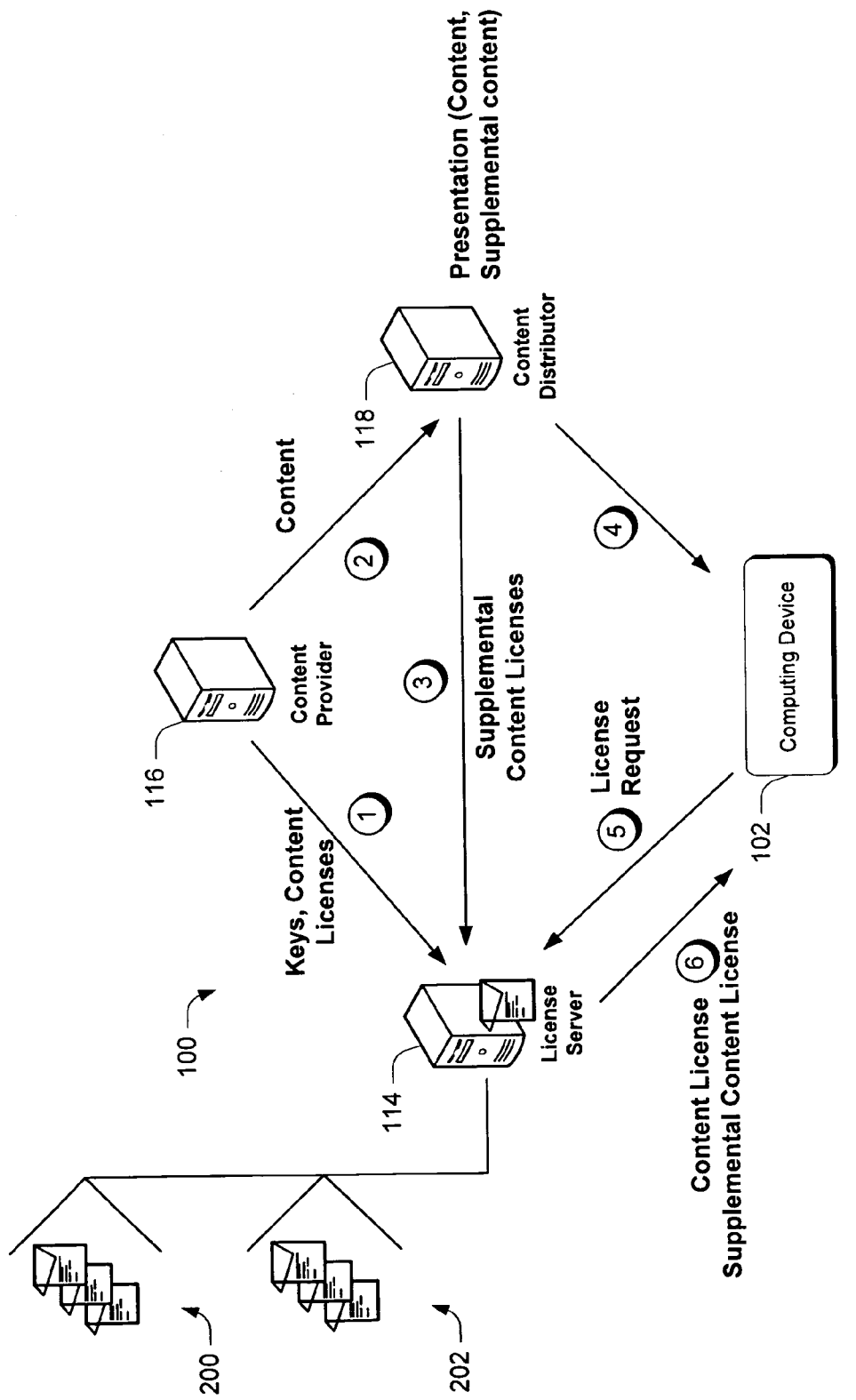
FIG. 2 illustrates aspects of the FIG. 1 operating environment in accordance with one or more embodiments.

FIG. 2 illustrates the FIG. 1 operating environment with a number of components removed for clarity. In this example, content provider 116 and license server 114 have separately negotiated a process by which licenses can be served to users for content that has been protected. Part of this process can involve providing various keys and licenses to the license server 114 that are to be subsequently distributed. In one or more embodiments, individual licenses associated with the content provider's content include policy expressions that are evaluated and executed on a client-side device such as computing device 102.

In one or more embodiments, content provider 116 provides content to content distributor 118. The content that is distributed to the content distributor can be protected by virtue of being encrypted with a key or can be provided in the clear. In the latter case, the content distributor may run both the content server and the license server.

When content distributor 118 receives the content from content provider 116, it can build a presentation that includes not only the content (which can be protected by encryption), but also supplemental content that it can add. Any suitable type of supplemental content can be utilized. For example, in some embodiments a content distributor's business model may be to sell advertising that is to be distributed with certain protected content. This advertising content can then be incorporated or integrated with the protected content in the content distributor's presentation. Other types of supplemental content can be utilized without departing from the spirit and scope of the claimed subject matter.

Content distributor 118 can also create and then provide supplemental content licenses to license server 114 that include policy expressions that affect rights associated with content provided by content provider 116. Examples of such licenses and policy expressions are provided below.

Having built its presentation, the content distributor 118 can now distribute its presentation to computing device 102. When an end-user on computing device 102 attempts to play the protected content, the computing-device's media player application communicates with license server 114 to request a license for the presentation. It is to be appreciated and understood that the request for a presentation license can come at any suitable time. For example, the request for a presentation license can come when the presentation is received but before a user attempts to play the presentation.

In one or more embodiments, the license server 114 can return a presentation license which is a combination of multiple different licenses associated with content that is contained within the presentation. So, for example, a particular license server may have a collection of licenses 200 that is associated with the content provider's content. Likewise, the license server may also have a collection of licenses 202 that is associated with supplemental content that comprises part of a presentation.

Once the presentation license is returned to the user or, more accurately, the user's computing device 102, the presentation runtime environment and the DRM runtime environment can work in concert to ensure that policy expressions that comprise portions of the received licenses are executed accordingly.

The system of FIGS. 1 and 2 can, among other things, be utilized by content providers that do not wish to be associated with or involved in the process of using third-party business models to distribute their content. In at least some embodiments, content that is distributed from the content providers can remain encrypted and thus protected. Yet, by virtue of an agreement between the content providers and the content distributors, the content distributors are free to incorporate the protected content in their own presentations which can leverage their own business models in any suitable way.

Having discussed an example implementation, consider now some examples of licenses and how policy expressions in one license for one particular piece of content can be used to affect rights associated with another piece of content.

Figure 3:
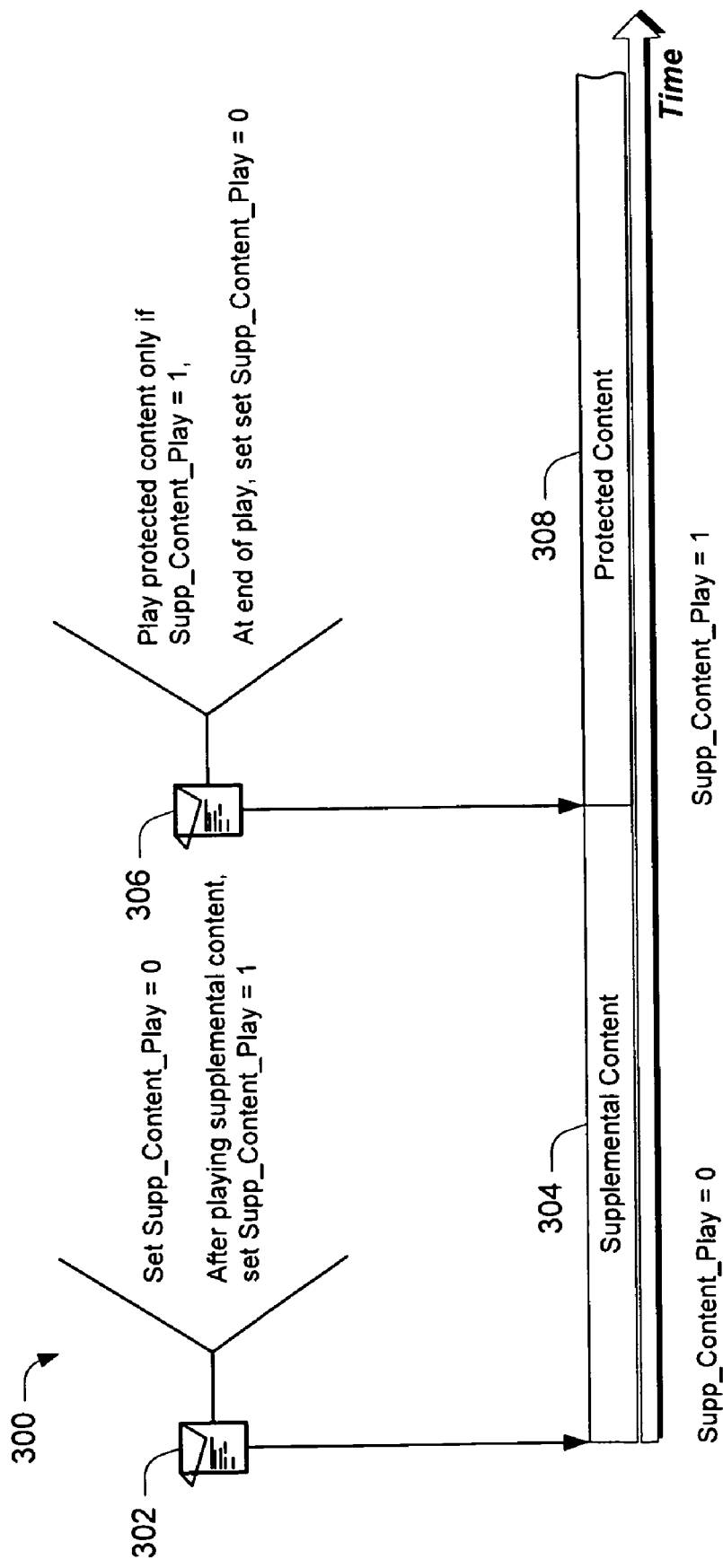
FIG. 3 illustrates a system that utilizes interdependent licenses in accordance with one or more embodiments.

FIG. 3 illustrates a system, generally at 300, that includes a supplemental content license 302 associated with supplemental content 304, and a content license 306 associated with protected content 308. In this example, assume that the supplemental content comprises an advertisement that is to be shown before a user is able to consume protected content 308. In this example, license 302 includes a policy expression that defines an attribute associated with whether the supplemental content has been played. In addition, the license defines a condition associated with setting the state or value of that attribute. Specifically, in this example, an attribute "Supp_Content_Play" is used to define a state that indicates whether the supplemental content has been played. In this particular example, license 302 first sets this attribute's state to "0", indicating that the supplemental content has not been played. In addition, the license includes a policy expression that indicates that after the supplemental content is played, this attribute should be set to "1".

License 306 includes a policy expression that indicates that the protected content is to be played only if the attribute "Supp_Content_Play" is set to "1". In addition, a policy expression indicates that this attribute is to be reset at the end of play.

Accordingly, in this example, a first license associated with a particular piece of content—here, license 302 associated with content 304—includes policy expressions that affect a user's rights with respect to a second piece of content—here content 308. In addition, the license associated with the second piece of content—here license 306—includes a policy expression that defines rights associated with the second piece of content as a function of the state of an attribute associated with the first piece of content. In one or more embodiments, license 306 can include a mechanism to verify that the "Supp_Content_Play" attribute was set to "1" by a specific licensee. For example, license 306 can contain a statement such as "Play protected content if Supp_Content_Play was set to "1" by Company_A", where Company_A is identified by a unique identifier.

The example just above provides a very simple scenario in which license interdependencies can be defined in terms of policy expressions that affect rights associated with content governed by various licenses. It is to be appreciated and understood that various other interdependencies can be developed to provide for other different scenarios. For example, policy expressions can be defined in a particular license that disable fast-forward functionality for particular piece of content. For example, if a content distributor desires for the user to watch or at least play a particular piece of content before another piece of content, a policy expression in an associated license can set an attribute that disables fast-forward functionality in the presentation runtime environment. Likewise, a policy expression in a particular license might enable or allow fast-forward functionality for particular piece of content in an event the user has already watched that content within the last 24 hours. Similarly, a policy expression in a license may again disable fast-forward functionality with respect to one piece of content if the user has watched more than one minute of a second piece of content.

Additional scenarios can be provided through the use of policy expressions. For example, policy expressions in a particular license may enable a user to skip a piece of content if, for example, they clicked on embedded advertising in another piece of content. Further, a policy expression might be used to allow a user to skip particular pieces of content if, for example, the user is a subscriber to a particular service. Additionally, a policy expression might be used to allow a user to skip pieces of content between particular times of the day, but otherwise disable fast-forward functionality at other times of the day.

Yet other scenarios can be provided that are bit more complex than those discussed above. For example, some types of protected content such as a movie, might be divided into two separate files. Supplemental content in the form of an advertisement may be provided and the license associated with the supplemental content may specify that the advertisement is to be played in the middle of the movie.

It is to be appreciated and understood that many different types of scenarios can be provided using the techniques described above without departing from the spirit and scope of the claimed subject matter.

Having discussed some example scenarios that can utilize license interdependencies, consider now a system in which such interdependencies can be utilized to enable a user to access and consume to content.

Figure 4:
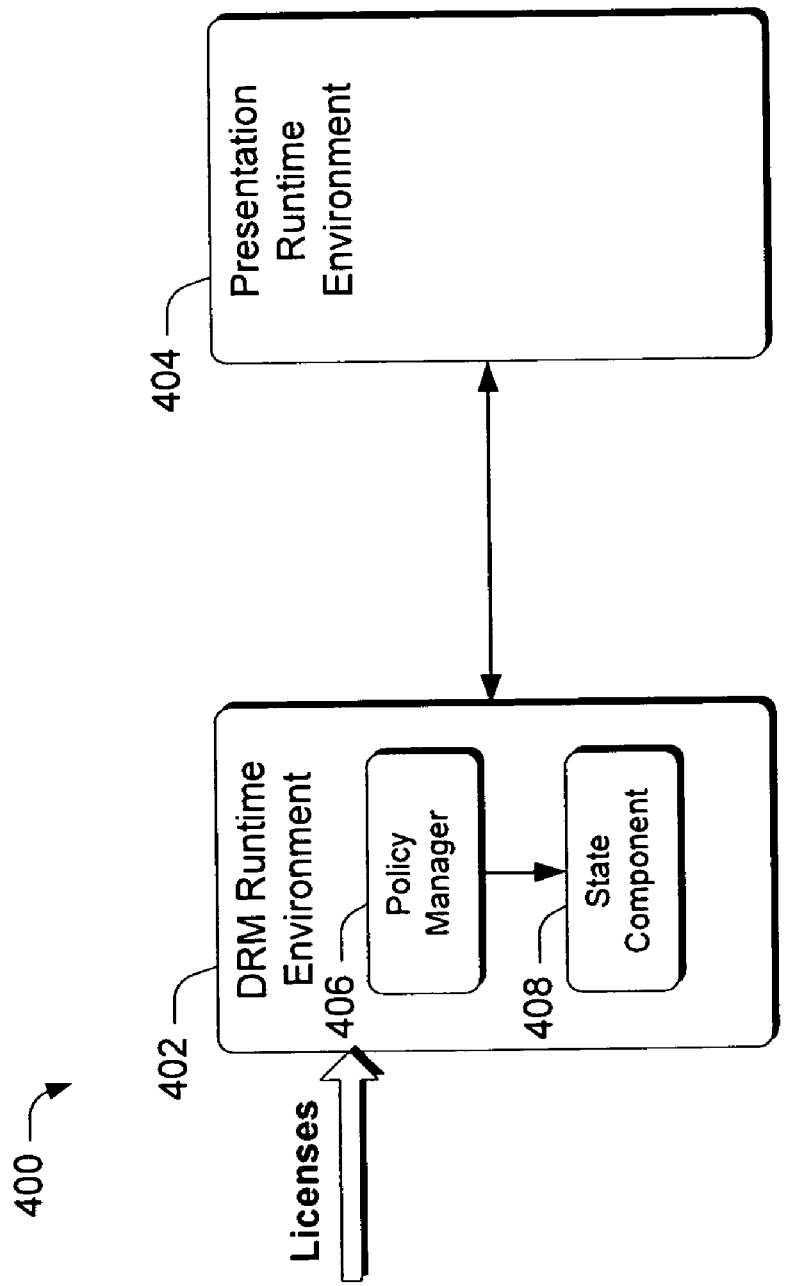
FIG. 4 illustrates an example system in accordance with one or more embodiments.

Specifically, FIG. 4 illustrates a system in accordance with one embodiment generally at 400. In this example, system 400 includes a DRM runtime environment 402 and a presentation runtime environment 404 both of which execute on a client-side device, such as device 102 in FIG. 1. DRM runtime environment includes a policy manager 406 and a state component 408. In operation, licenses flow into the DRM runtime environment as described above. Policy manager 406 is configured to analyze licenses that are received by the DRM runtime environment. Policy manager 406 is in communication with state component 408 and, as appropriate, can set an applicable state on the state component. In addition, DRM runtime environment 402 communicates with presentation runtime environment 404 to receive information on the state of a particular presentation. Such information can be used by the DRM runtime environment to assign attribute values within state component 408. For example, assume that a user has downloaded some protected content and in addition, some advertising that is designed to go along with the protected content. In the license for the advertising content, a policy expression may specify that the advertising must be less than two weeks old from the time that it was downloaded and it must be played prior to the protected content. Now, the user can take their protected content and advertising content off-line and can still consume the protected content as long as they have consumed the advertising and the advertising is less than two weeks old.

Figure 5:
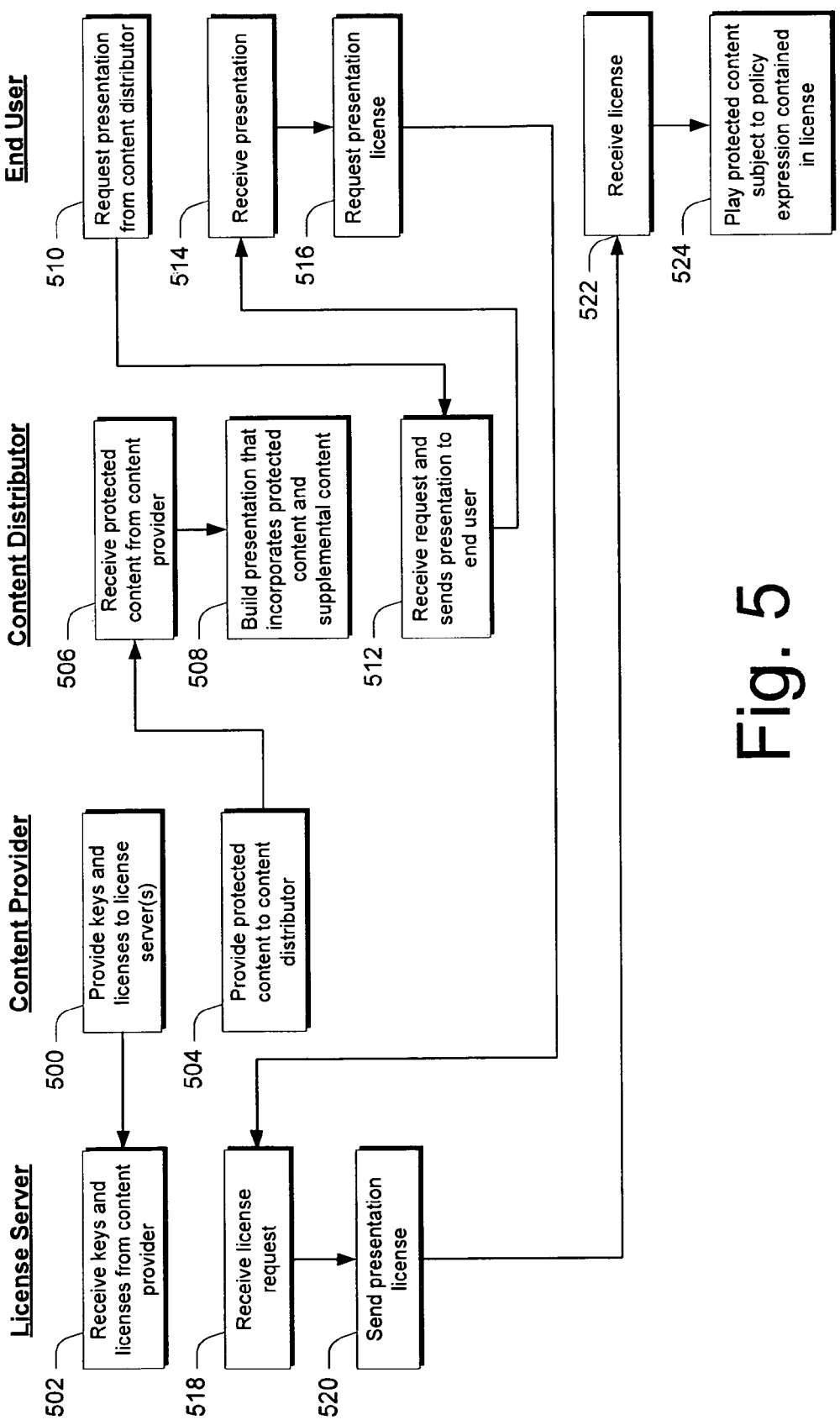
FIG. 5 is a flow diagram that describes steps in a method in accordance with one or more embodiments.

FIG. 5 is a flow diagram that describes steps in a content distribution method in accordance with one or more embodiments. The method can be implemented in connection with any suitable hardware, software, firmware or combination thereof. In at least some embodiments, the method can be implemented using a system such as that shown and described in FIGS. 1 and 2. In FIG. 5, various designations have been utilized to designate which entities perform which acts. For example, under the designation "License Server", acts that are performed by a suitably configured license server appear. Further, acts that are performed by a content provider appear under the designation "Content Provider", and so on.

Step 500 provides, by a content provider, one or more keys and licenses to one or more license servers. Any suitable keys can be provided to the license servers. In various embodiments, the keys can be utilized to decrypt or otherwise access content that has been protected. Step 502 receives, with a license server, the keys and licenses from the content provider. These keys are subsequently utilized by the license server in licenses that are provided to end users, as will become apparent below. The licenses that are received from the content provider can include policy expressions to accomplish the functionality that is described above. Step 504 provides protected content to one or more content distributors. Step 506 receives, with the content distributor, the content from the content provider. Step 508 builds a presentation that incorporates protected content and supplemental content. Any suitable supplemental content can be utilized. But one example of such supplemental content is advertising material. In addition, the content distributor, as part of this step, can publish a license for the supplemental content. The license can be published by sending it to a license server for distribution.

Step 510 requests, by the end-user, a presentation from a content distributor. Step 512 receives the request and sends the presentation to the end-user. Step 514 receives the presentation and step 516 requests a presentation license. In the illustrated and described embodiment, a presentation license can comprise multiple different licenses each of which are associated with a particular piece of content that appears in a presentation. Thus, in some senses, a presentation license can be considered as a logical collection of individual licenses each of which can potentially affect rights associated with other content.

Step 518 receives, with the license server, the license request. Step 520 sends a presentation license to the end-user. Step 522 receives the license and step 524 plays protected content subject to policy expressions contained in the license. Example of how this can be done are provided above.

Using the above-described techniques, a license associated with one piece of content can include policy expressions that affect rights associated with other pieces of content. In at least some embodiments, such arrangement can allow flexibility in so far as various content is assembled together to form a presentation. For example, the content provider need not be concerned with the specific supplemental content that licensed content distributors can incorporate with their protected content. In at least some embodiments, and those in which the supplemental content comprises advertising material, such can provide content distributors with flexibility in selecting advertisements that are targeted for particular end-users.

Example Computing Device

Figure 6:
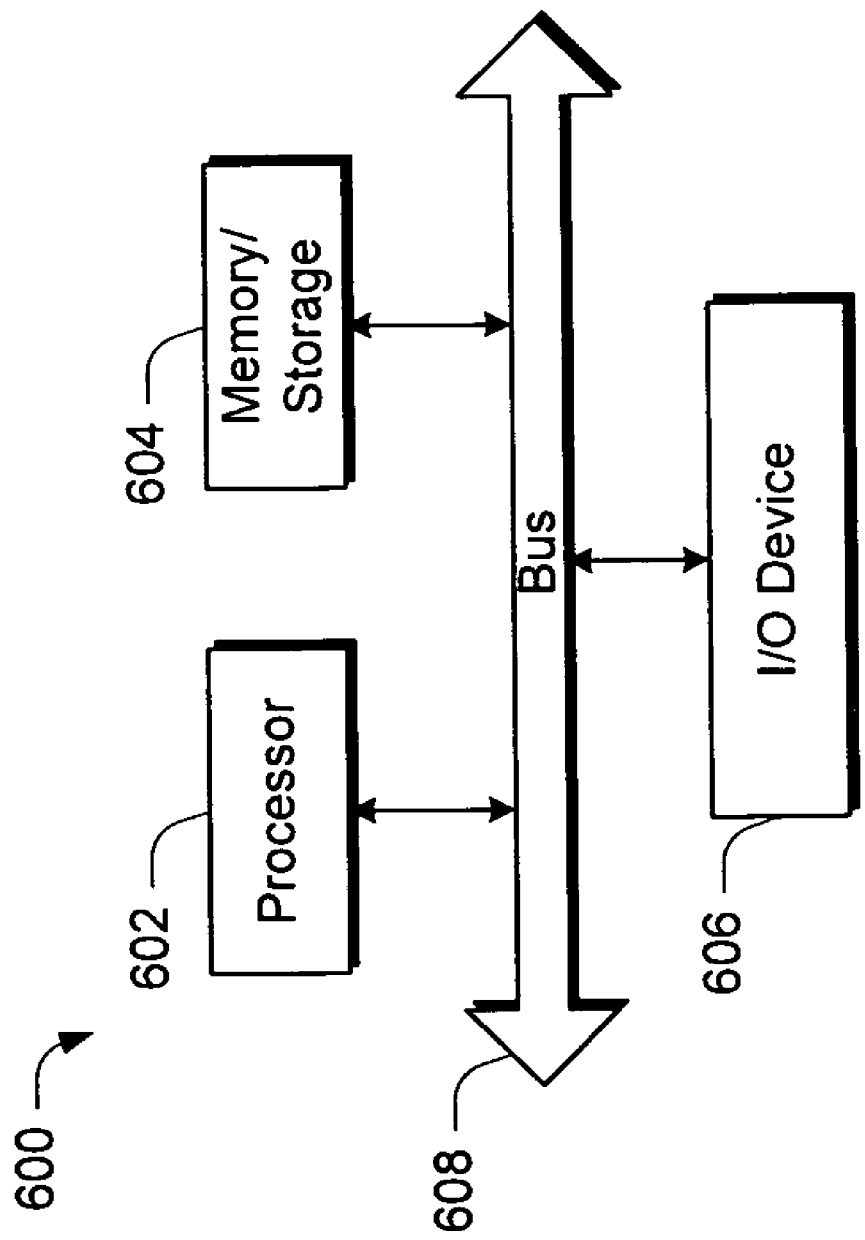
FIG. 6 illustrates an example system in accordance with one or more embodiments.

FIG. 6 illustrates an example computing device 600 that can implement the various embodiments described above. Computing device 600 can be, for example, any suitable computing device such as a client device and/or server device.

Computing device 600 includes one or more processors or processing units 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Component 604 can include volatile media (such as random access memory (RAM)) and/or non-volatile media (such as read only memory (ROM), Flash memory, optical disks, magnetic disks, and so forth). Component 604 can include fixed media (e.g., RAM, ROM, a fixed hard drive, etc.) as well as removable media (e.g., a Flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

In one or more embodiments, a license associated with a first piece of content can grant rights with respect to a second and/or additional pieces of content. That is, language that is included in a first license can express a policy that is interpreted by a client-side device. This policy can establish rights with respect to additional pieces of content. Accordingly, policy enforcement with respect to licensed content can take place on the client-side device and can establish how different content is to be played relative to one another.

In one or more embodiments, the client-side device includes a digital rights management (DRM) runtime environment that includes a policy manager and a state component. The policy manager receives licenses associated with different pieces of content, typically combined in a presentation. Individual licenses contain policy expressions that define how particular attributes or states are to be set in the state component. When a user takes an action with respect to a particular piece of content having an associated license, the policy manager can set a particular attribute or change a state in the state component. This changed attribute or state can then affect rights associated with a different piece of content that comprises part of the presentation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more computer-readable media;
a first license file embodied on the one or more computer-readable media and associated with a first piece of content, wherein the first license file includes policy expressions that affect a user's rights with respect to a second and/or additional pieces of content that comprise a presentation that includes the first, second and/or additional pieces of content, the first license file configured to be distributable and processed by a client-side digital rights management runtime environment to which the presentation is distributed;
a second license file embodied on the one or more computer-readable media and associated with the second piece of content, wherein the second license file includes policy expressions that define rights associated with the second piece of content as a function of a state of an attribute associated with the first piece of content, the second license file configured to be distributable and processed by the client-side digital rights management runtime environment;
wherein the policy expressions contained within the first and second license files are executable by the client-side digital rights management runtime environment;
wherein, independent of a device associated with the client-side digital rights management environment being online, the policy expressions are executable by the client-side digital rights management runtime environment; and
wherein, independent of the device associated with the client-side digital rights management environment being online, the content is configured to be consumable by the device.

2. The system of claim 1, wherein policy expressions in the first license file are configured to cause one or more attributes in the client-side digital rights management runtime environment to be set.

3. The system of claim 1 further comprising a license server embodying the one or more computer-readable media.

4. The system of claim 1 further comprising a computing device embodying the one or more computer-readable media.

5. The system of claim 4, wherein the computing device comprises a computing device to which the presentation has been distributed.

6. The system of claim 1, wherein policy expressions can enable and disable functionality on a computing device to which the presentation has been distributed.

7. The system of claim 6, wherein the functionality comprises functionality associated with a media player application.

8. The system of claim 1, wherein the first, second and/or additional pieces of content comprise separate files.

9. A computing device comprising:
one or more computer readable media;
one or more processors;
computer executable instructions on the computer readable media which, when executed, implement a digital rights management runtime environment comprising:
a policy manager configured to receive and analyze license files associated with presentations that are received by the computing device; and
a state component associated with the policy manager and configured to have various attribute states set by the policy manager,
wherein presentations that are received by the computing device comprise multiple pieces of content each of which has its own associated license file, wherein individual license files include policy expressions that affect a user's rights with regard to content associated with other license files, wherein each presentation has an associated presentation license, the presentation license comprising a combination of the individual license files associated with the multiple pieces of content of the presentation, wherein the policy manager sets attribute states in the state component responsive to said policy expressions, wherein said policy expressions are executable by the digital rights management runtime environment independent of the computing device being online, and wherein the pieces of content are configured to be consumable by the computing device independent of the computing device being online.

10. The computing device of claim 9, wherein said multiple pieces of content comprise separate files.

11. The computing device of claim 9, wherein policy expressions can enable and disable functionality on the computing device.

12. The computing device of claim 9, wherein policy expressions can enable and disable functionality associated with a media player application on the computing device.

13. A method implemented at least in part by a computer, the method comprising:

receiving protected content from a content provider, the protected content associated with a first license file configured to affect rights associated with the protected content;

building a presentation that incorporates the protected content and supplemental content;

creating and publishing a supplemental content license file that includes policy expressions that also affect rights associated with the protected content, wherein the supplemental content license file is configured to:

include a policy expression allowing a piece of content contained in the presentation to be skipped when a user using the content is a subscriber to a particular service; and be processed by a Digital Rights Management (DRM) environment on a computing device, in conjunction with the first license file, to affect the rights associated with the protected content; and providing the supplemental content license file to a license server.

14. The method of claim 13, wherein the supplemental content comprises advertising material.

15. The method of claim 13, wherein the protected content and the supplemental content comprise separate files.

16. The method of claim 13 further comprising distributing the presentation to one or more computing devices.

17. The method of claim 13, wherein the protected content is associated with a license file that defines rights associated with the protected content as a function of a state of an attribute associated with the supplemental content.

18. The method of claim 13, wherein said policy expressions are configured to enable attribute states to be set in the digital rights management runtime environment executing on the computing device to which the presentation is to be distributed.

19. The method of claim 13, wherein the policy expressions can enable and disable functionality in a media player application executing on a client device to which the presentation is to be distributed.

* * * * *